United States Patent
Cho et al.

(10) Patent No.: US 9,816,589 B2
(45) Date of Patent: Nov. 14, 2017

(54) AUTOMOTIVE MULTISTAGE TRANSMISSION

(71) Applicant: Hyundai Motor Company, Seoul (KR)

(72) Inventors: Won Min Cho, Hwaseong-si (KR); Jae Chang Kook, Hwaseong-si (KR); Myeong Hoon Noh, Seongnam-si (KR); Seong Wook Ji, Ansan-si (KR); Kang Soo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 105 days.

(21) Appl. No.: 14/879,891

(22) Filed: Oct. 9, 2015

(65) Prior Publication Data

US 2016/0258514 A1    Sep. 8, 2016

(30) Foreign Application Priority Data

Mar. 5, 2015  (KR) .......................... 10-2015-0030772

(51) Int. Cl.
*F16H 3/62* (2006.01)
*F16H 3/44* (2006.01)
*F16H 37/06* (2006.01)
*F16H 3/66* (2006.01)

(52) U.S. Cl.
CPC ....... *F16H 3/66* (2013.01); *F16H 2200/0065* (2013.01); *F16H 2200/0069* (2013.01); *F16H 2200/0073* (2013.01); *F16H 2200/2012* (2013.01); *F16H 2200/2046* (2013.01); *F16H 2200/2097* (2013.01)

(58) Field of Classification Search
CPC ................. F16H 2200/2012; F16H 2200/2046
See application file for complete search history.

(56) References Cited

U.S. PATENT DOCUMENTS

| | | | |
|---|---|---|---|
| 6,634,980 B1 * | 10/2003 | Ziemer | F16H 3/663 475/275 |
| 8,303,455 B2 | 11/2012 | Gumpoltsberger et al. | |
| 2007/0202982 A1 * | 8/2007 | Gumpoltsberger | F16H 3/66 475/275 |
| 2009/0017975 A1 * | 1/2009 | Hart | F16H 3/66 475/276 |
| 2010/0210392 A1 | 8/2010 | Hart et al. | |
| 2010/0216588 A1 | 8/2010 | Wittkopp et al. | |

FOREIGN PATENT DOCUMENTS

| KR | 10-2013-0000173 A | 1/2013 |
|---|---|---|
| KR | 10-2013-0031457 A | 3/2013 |

* cited by examiner

*Primary Examiner* — Tisha Lewis
(74) *Attorney, Agent, or Firm* — Morgan, Lewis & Bockius LLP

(57) ABSTRACT

An automotive multistage transmission may include an input shaft and an output shaft, a first planetary gear set, a second planetary gear set, a third planetary gear set, and a fourth planetary gear set each including three rotary members and transmitting torque between the input shaft and the output shaft, and at least six shifting members connected to the rotary members of the planetary gear sets.

7 Claims, 3 Drawing Sheets

FIG. 2

| SHIFTING STAGE | CL1 | CL2 | CL3 | CL4 | CL5 | CL6 | GEAR RATIO |
|---|---|---|---|---|---|---|---|
| 1ST |  | O |  | O |  | O | 4.965 |
| 2ND |  | O | O | O |  |  | 2.961 |
| 3RD |  | O |  | O | O |  | 1.888 |
| 4TH |  | O | O |  | O |  | 1.321 |
| 5TH |  | O |  |  | O | O | 1.253 |
| 6TH |  | O | O |  |  | O | 1.000 |
| 7TH | O | O | O |  |  |  | 0.830 |
| 8TH | O | O |  |  |  | O | 0.802 |
| 9TH | O |  | O |  |  | O | 0.700 |
| 10TH | O |  |  |  | O | O | 0.570 |
| 11TH | O |  | O |  | O |  | 0.455 |
| REV |  |  | O | O |  | O | 2.590 |

FIG. 3

| SHIFTING STAGE | CL1 | CL2 | CL3 | CL4 | CL5 | CL6 | GEAR RATIO |
|---|---|---|---|---|---|---|---|
| 1ST |  | ○ |  | ○ |  | ○ | 4.965 |
| 2ND |  | ○ | ○ | ○ |  |  | 2.961 |
| 3RD |  | ○ |  | ○ | ○ |  | 1.888 |
| 4TH |  | ○ | ○ |  | ○ |  | 1.321 |
| 5TH |  | ○ | ○ |  |  | ○ | 1.000 |
| 6TH | ○ | ○ | ○ |  |  |  | 0.830 |
| 7TH | ○ | ○ |  |  |  | ○ | 0.802 |
| 8TH | ○ |  | ○ |  |  | ○ | 0.700 |
| 9TH | ○ |  |  |  | ○ | ○ | 0.570 |
| 10TH | ○ |  | ○ |  | ○ |  | 0.455 |
| REV |  |  | ○ | ○ |  | ○ | 2.590 |

FIG. 4

| SHIFTING STAGE | CL1 | CL2 | CL3 | CL4 | CL5 | CL6 | GEAR RATIO |
|---|---|---|---|---|---|---|---|
| 1ST |  | ○ |  | ○ |  | ○ | 4.965 |
| 2ND |  | ○ | ○ | ○ |  |  | 2.961 |
| 3RD |  | ○ |  | ○ | ○ |  | 1.888 |
| 4TH |  | ○ | ○ |  | ○ |  | 1.321 |
| 5TH |  | ○ | ○ |  |  | ○ | 1.000 |
| 6TH | ○ | ○ | ○ |  |  |  | 0.830 |
| 7TH | ○ |  | ○ |  |  | ○ | 0.700 |
| 8TH | ○ |  |  |  | ○ | ○ | 0.570 |
| 9TH | ○ |  | ○ |  | ○ |  | 0.455 |
| REV |  |  | ○ | ○ |  | ○ | 2.590 |

AUTOMOTIVE MULTISTAGE TRANSMISSION

CROSS REFERENCE TO RELATED APPLICATION(S)

The present application claims priority to Korean Patent Application No. 10-2015-0030772, filed Mar. 5, 2015, the entire contents of which is incorporated herein for all purposes by this reference.

BACKGROUND OF THE INVENTION

Field of the Invention

The present invention relates to an automotive multistage transmission and, more particularly, to a technology capable of improving fuel efficiency of a vehicle by achieving as many shifting stages as possible with the fewest parts and the simplest configuration.

Description of Related Art

Recently, increasing oil prices have forced auto manufacturers into extreme competition in order to improve fuel efficiency. For engines in particular, manufacturers have been trying to reduce the weight and improve fuel efficiency through downsizing, etc.

Alternatively, as a method capable of improving fuel efficiency through the transmission in a vehicle, there is a method of operating an engine at a more efficient operation point by increasing the number of shifting stages of the transmission, thereby improving fuel efficiency.

In addition, increasing the number of shifting stages of the transmission enables an engine to operate in a relatively lower RPM range, so a vehicle can run more quietly.

However, as the number of shifting stages of the transmission increases, the number of parts in the transmission increases, so work efficiency while mounting the transmission in a vehicle, the manufacturing cost, weight, and power transmission efficiency may become poor. Accordingly, to maximize an improvement in fuel efficiency that may be realized by increasing the number of shifting stages of the transmission, it may be important to design a transmission with a structure capable of achieving the maximum efficiency with the fewest number of parts and the simplest configuration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automotive multistage transmission that can maximally improve fuel efficiency of a vehicle by operating an engine at an optimum operation point and that can drive the vehicle more quietly by operating the engine more silently, by achieving nine or more forward shifting stages and one or more rearward shifting stages with fewer parts and a simpler configuration than in the related art.

According to various aspects of the present invention, an automotive multistage transmission may include an input shaft and an output shaft, a first planetary gear set, a second planetary gear set, a third planetary gear set, and a fourth planetary gear set each including three rotary members and transmitting torque between the input shaft and the output shaft, and at least six shifting members connected to the rotary members of the planetary gear sets, in which in the first planetary gear set, a first rotary member may be continuously connected to the input shaft and may be selectively connected to both a second rotary member of the first planetary gear set and a third rotary member of the fourth planetary gear set, a second rotary member may be fixable to at least one of the shifting members, and a third rotary member may be continuously connected to a second rotary member of the second planetary gear set, in the second planetary gear set, a first rotary member may be selectively connected to both a second rotary member and the third rotary member of the fourth planetary gear set, the second rotary member may be selectively connected to a third rotary member of the third planetary gear set, and a third rotary member may be continuously connected to a second rotary member of the third planetary gear set, in the third planetary gear set, a first rotary member may be continuously connected to a transmission case, and the third rotary member may be continuously connected to a first rotary member of the fourth planetary gear set, and in the fourth planetary gear set, the second rotary member may be continuously connected to the output shaft.

The first planetary gear set, the second planetary gear set, the third planetary gear set, and the fourth planetary gear set may be sequentially arranged in an axial direction of the input shaft and the output shaft.

The second rotary member of the first planetary gear set may be fixable to the transmission case via a fourth clutch of the shifting members, and remaining shifting members except for the fourth clutch may form selective connection structures between the rotary members of the planetary gear sets.

A first clutch of the shifting members may form a selective connection structure between the first rotary member and the second rotary member of the first planetary gear set, a second clutch of the shifting members may form a selective connection structure between the first rotary member of the first planetary gear set and the third rotary member of the fourth planetary gear set, a third clutch of the shifting members may form a selective connection structure between the first rotary member of the second planetary gear set and the second rotary member of the fourth planetary gear set, a fifth clutch of the shifting members may form a selective connection structure between the second rotary member of the second planetary gear set and the third rotary member of the third planetary gear set, and a sixth clutch of the shifting members may form a selective connection structure between the first rotary member of the second planetary gear set and the third rotary member of the fourth planetary gear set.

According to various aspects of the present invention, an automotive multistage transmission may include a first planetary gear set, a second planetary gear set, a third planetary gear set, and a fourth planetary gear set each including three rotary members, respectively, six shifting members selectively providing friction force, and eight rotary shafts connected to the rotary members of the planetary gear sets, in which in the eight rotary shafts, a first rotary shaft may be an input shaft directly connected to a first rotary member of the first planetary gear set, a second rotary shaft may be directly connected to a second rotary member of the first planetary gear set, a third rotary shaft may be directly connected to both a third rotary member of the first planetary gear set and a second rotary member of the second planetary gear set, a fourth rotary shaft may be directly connected to a first rotary member of the second planetary gear set, a fifth rotary shaft may be directly connected to both a third rotary member of the second planetary gear set and a second rotary member of the third planetary gear set, a sixth rotary shaft may be directly connected to both a third rotary member of the third planetary gear set and a first rotary member of the fourth planetary gear set, a seventh rotary shaft may be directly connected to a third rotary member of the fourth planetary gear set, and an eighth rotary shaft may be an output shaft directly connected to a second rotary member of the fourth planetary gear set, in the six shifting members, a first clutch may be disposed between the first rotary shaft and the second rotary shaft, a second clutch may be disposed between the first rotary shaft and the seventh rotary shaft, a third clutch may be disposed between the fourth rotary shaft and the eighth rotary shaft, a fourth clutch may be disposed between the second rotary shaft and a transmission case, a fifth clutch may be disposed between the third rotary shaft and the sixth rotary shaft, and a sixth clutch may be disposed between the fourth rotary shaft and the seventh rotary shaft.

According to the present invention, it is possible to maximally improve fuel efficiency of a vehicle by operating an engine at an optimum operation point and drive the vehicle more quietly by operating the engine more silently, by achieving nine or more forward shifting stages and one or more rearward shifting stages with fewer parts and a simpler configuration than in the related art.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing operation modes of the exemplary automotive multistage transmission shown in FIG. 1 when the transmission achieves eleven shifting stages.

FIG. 3 is a table showing operation modes of the exemplary automotive multistage transmission shown in FIG. 1 when the transmission achieves ten shifting stages.

FIG. 4 is a table showing operation modes of the exemplary automotive multistage transmission shown in FIG. 1 when the transmission achieves nine shifting stages.

Figure 1:
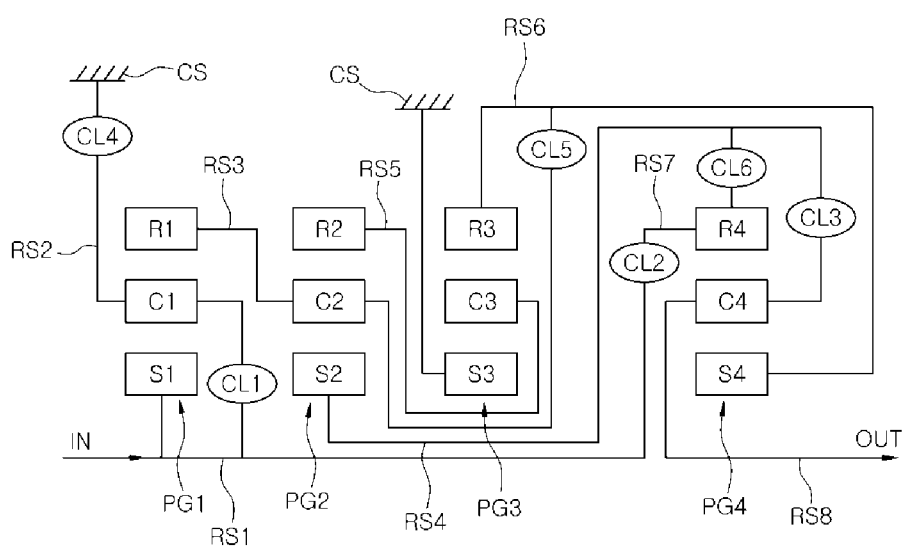
FIG. 1 is a diagram showing the configuration of an exemplary automotive multistage transmission according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an automotive multistage transmission according to various embodiments of the present invention includes an input shaft IN and an output shaft OUT, a first planetary gear set PG1, a second planetary gear set PG2, a third planetary gear set PG3, and a fourth planetary gear set PG4 each including three rotary members, and transmitting torque between the input shaft IN and the output shaft OUT, and at least six shifting members connected to the rotary members of the planetary gear sets.

As for the first planetary gear set PG1, a first rotary member S1 is continuously connected to the input shaft IN and is selectively connected to both a second rotary member C1 of the first planetary gear set PG1 and a third rotary member R4 of the fourth planetary gear set PG4, a second rotary member C1 is fixable to any one of the shifting members, and a third rotary member R1 is continuously connected to a second rotary member C2 of the second planetary gear set PG2.

As for the second planetary gear set PG2, a first rotary member S2 is selectively connected to both a second rotary member C4 and the third rotary member R4 of the fourth planetary gear set PG4, the second rotary member C2 is selectively connected to a third rotary member R3 of the third planetary gear set PG3, and a third rotary member R2 is continuously connected to a second rotary member C3 of the third planetary gear set PG3.

As for the third planetary gear set PG3, a first rotary member S3 is continuously connected to a transmission case CS, and the third rotary member R3 is continuously connected to a first rotary member S4 of the fourth planetary gear set PG4.

As for the fourth planetary gear set PG4, the second rotary member C4 is continuously connected to the output shaft OUT.

The first planetary gear set PG1, the second planetary gear set PG2, the third planetary gear set PG3, and the fourth planetary gear set PG4 are sequentially arranged in an axial direction of the input shaft IN and the output shaft OUT.

The second rotary member C1 of the first planetary gear set PG1 is fixable to the transmission case CS via a fourth clutch CL4 of the shifting members.

Accordingly, the fourth clutch CL4 can function as a brake that can restrict or allow a rotation of the second rotary member C1 of the first planetary gear set PG1.

The remaining shifting members except for the fourth clutch CL4 form selective connection structures between the rotary members of the planetary gear sets.

That is, a first clutch CL1 of the shifting members forms a selective connection structure between the first rotary member R1 and the second rotary member C1 of the first planetary gear set PG1, a second clutch CL2 of the shifting members forms a selective connection structure between the first rotary member R1 of the first planetary gear set PG1 and the third rotary member R4 of the fourth planetary gear set PG4, a third clutch CL3 of the shifting members forms a selective connection structure between the first rotary member S2 of the second planetary gear set PG2 and the second rotary member C4 of the fourth planetary gear set PG4, a fifth clutch CL5 of the shifting members forms a selective connection structure between the second rotary member C2 of the second planetary gear set PG2 and the third rotary member R3 of the third planetary gear set PG3, and a sixth clutch CL6 of the shifting members forms a selective connection structure between the first rotary member S2 of the second planetary gear set PG2 and the third rotary member R4 of the fourth planetary gear set PG4.

In various embodiments, the first rotary member S1, the second rotary member C1, and the third rotary member R1 of the first planetary gear set PG1 are a first sun gear, a first carrier, and a first ring gear, respectively, the first rotary member S2, the second rotary member C2, and the third rotary member R2 of the second planetary gear set PG2 are a second sun gear, a second carrier, and a second ring gear, respectively, the first rotary member S3, the second rotary member C3, and the third rotary member R3 of the third planetary gear set PG3 are a third sun gear, a third carrier, and a third ring gear, respectively, and the first rotary member S4, the second rotary member C4, and the third rotary member R4 of the fourth planetary gear set PG4 are a fourth sun gear, a fourth carrier, and a fourth ring gear, respectively.

The automotive multistage transmission having the above-mentioned configuration may be expressed as follows.

The automotive multistage transmission of the present invention includes: the first planetary gear set PG1, the second planetary gear set PG2, the third planetary gear set PG3, and the fourth planetary gear set PG4 each including three rotary members, respectively, the six shifting members selectively providing a friction force, and eight rotary shafts connected to the rotary members of the planetary gear sets.

In various embodiments, a first rotary shaft RS1 is an input shaft IN directly connected to the first rotary member S1 of the first planetary gear set PG1, a second rotary shaft RS2 is directly connected to the second rotary member C1 of the first planetary gear set PG1, a third rotary shaft RS3 is directly connected to both the third rotary member R1 of the first planetary gear set PG1 and the second rotary member C2 of the second planetary gear set PG2, a fourth rotary shaft RS4 is directly connected to the first rotary member S2 of the second planetary gear set PG2, a fifth rotary shaft RS5 is directly connected to both the third rotary member R2 of the second planetary gear set PG2 and the second rotary member C3 of the third planetary gear set PG3, a sixth rotary shaft RS6 is directly connected to both the third rotary member R3 of the third planetary gear set PG3 and the first rotary member S4 of the fourth planetary gear set PG4, a seventh rotary shaft RS7 is directly connected to the third rotary member R4 of the fourth planetary gear set PG4, and an eighth rotary shaft RS8 is an output shaft OUT directly connected to the second rotary member C4 of the fourth planetary gear set PG4.

Further, in the six shifting members, the first clutch CL1 is disposed between the first rotary shaft RS1 and the second rotary shaft RS2, the second clutch CL2 is disposed between the first rotary shaft RS1 and the seventh rotary shaft RS7, the third clutch CL3 is disposed between the fourth rotary shaft RS4 and the eighth rotary shaft RS8, the fourth clutch CL4 is disposed between the second rotary shaft RS2 and the transmission case CS, the fifth clutch CL5 is disposed between the third rotary shaft RS3 and the sixth rotary shaft RS6, and the sixth clutch CL6 is disposed between the fourth rotary shaft RS4 and the seventh rotary shaft RS7.

As described above, the automotive multistage transmission of the present invention, which includes four single planetary gear sets and six shifting members, achieves eleven forward shifting stages and one rearward shifting stage according to an operation mode table shown in FIG. 2. That is, the automotive multistage transmission can achieve the eleven shifting stages with relatively fewer parts and a simpler configuration than in the conventional art. Therefore, the present invention can realize quiet driving and improvement in fuel efficiency of a vehicle, resulting in improvement in the commercial value of the vehicle.

Further, when the automotive multistage transmission of the present invention including the four single planetary gear sets and the six shifting members is operated according to another operation mode table shown in FIG. 3, which is formed by omitting the fifth shifting stage from the operation mode table shown in FIG. 2, the transmission can achieve ten forward shifting stages and one rearward shifting stage. Further, when the transmission is operated according to still another operation mode table shown in FIG. 4, which is formed by omitting the fifth and eighth shifting stages from the operation mode table shown in FIG. 2, the transmission can achieve nine forward shifting stages and one rearward shifting stage. Further, when being operated according to either of the two operation mode tables shown in FIG. 3 and FIG. 4, the multistage transmission of this invention may achieve clutch-to-clutch shifting in which gear shifting is realized between neighboring shifting stages by engaging one of the shifting members and disengaging another one of the shifting members.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automotive multistage transmission comprising:
an input shaft and an output shaft;
a first planetary gear set, a second planetary gear set, a third planetary gear set, and a fourth planetary gear set each including three rotary members and transmitting torque between the input shaft and the output shaft; and
at least six shifting members connected to the rotary members of the planetary gear sets,
wherein in the first planetary gear set, a first rotary member is continuously connected to the input shaft and is selectively connected to both a second rotary member of the first planetary gear set and a third rotary member of the fourth planetary gear set, the second rotary member is fixable to one of the shifting members, and a third rotary member is continuously connected to a second rotary member of the second planetary gear set, in the second planetary gear set, a first rotary member is selectively connected to both a second rotary member and the third rotary member of the fourth planetary gear set, the second rotary member is selectively connected to a third rotary member of the third planetary gear set, and a third rotary member is continuously connected to a second rotary member of the third planetary gear set, in the third planetary gear set, a first rotary member is continuously connected to a transmission case, and the third rotary member is continuously connected to a first rotary member of the fourth planetary gear set, and in the fourth planetary gear set, the second rotary member is continuously connected to the output shaft.

2. The automotive multistage transmission of claim 1, wherein the first planetary gear set, the second planetary gear set, the third planetary gear set, and the fourth planetary gear set are sequentially arranged in an axial direction of the input shaft and the output shaft.

3. The automotive multistage transmission of claim 2, wherein the second rotary member of the first planetary gear set is fixable to the transmission case via a fourth clutch of the shifting members, and remaining shifting members except for the fourth clutch form selective connection structures between the rotary members of the planetary gear sets.

4. The automotive multistage transmission of claim 3, wherein a first clutch of the shifting members forms a selective connection structure between the first rotary member and the second rotary member of the first planetary gear set, a second clutch of the shifting members forms a selective connection structure between the first rotary member of the first planetary gear set and the third rotary member of the fourth planetary gear set, a third clutch of the shifting members forms a selective connection structure between the first rotary member of the second planetary gear set and the second rotary member of the fourth planetary gear set, a fifth clutch of the shifting members forms a selective connection structure between the second rotary member of the second planetary gear set and the third rotary member of the third planetary gear set, and a sixth clutch of the shifting members forms a selective connection structure between the first rotary member of the second planetary gear set and the third rotary member of the fourth planetary gear set.

5. An automotive multistage transmission comprising:
a first planetary gear set, a second planetary gear set, a third planetary gear set, and a fourth planetary gear set each including three rotary members, respectively;
six shifting members selectively providing friction force; and
eight rotary shafts connected to the rotary members of the planetary gear sets, wherein in the eight rotary shafts, a first rotary shaft is an input shaft directly connected to a first rotary member of the first planetary gear set, a second rotary shaft is directly connected to a second rotary member of the first planetary gear set, a third rotary shaft is directly connected to both a third rotary member of the first planetary gear set and a second rotary member of the second planetary gear set, a fourth rotary shaft is directly connected to a first rotary member of the second planetary gear set, a fifth rotary shaft is directly connected to both a third rotary member of the second planetary gear set and a second rotary member of the third planetary gear set, a sixth rotary shaft is directly connected to both a third rotary member of the third planetary gear set and a first rotary member of the fourth planetary gear set, a seventh rotary shaft is directly connected to a third rotary member of the fourth planetary gear set, and an eighth rotary shaft is an output shaft directly connected to a second rotary member of the fourth planetary gear set, and wherein in the six shifting members, a first clutch is disposed between the first rotary shaft and the second rotary shaft, a second clutch is disposed between the first rotary shaft and the seventh rotary shaft, a third clutch is disposed between the fourth rotary shaft and the eighth rotary shaft, a fourth clutch is disposed between the second rotary shaft and a transmission case, a fifth clutch is disposed between the third rotary shaft and the sixth rotary shaft, and a sixth clutch is disposed between the fourth rotary shaft and the seventh rotary shaft.

6. The automotive multistage transmission of claim 5, wherein the first planetary gear set, the second planetary gear set, the third planetary gear set, and the fourth planetary gear set are sequentially arranged in an axial direction of the input shaft and the output shaft.

7. The automotive multistage transmission of claim 5, wherein in the six shifting members, the first clutch selectively connects the first rotary member and the second rotary member of the first planetary gear set to each other, the second clutch selectively connects the first rotary member of the first planetary gear set and the third rotary member of the fourth planetary gear set to each other, the third clutch selectively connects the first rotary member of the second planetary gear set and the second rotary member of the fourth planetary gear set to each other, the fifth clutch selectively connects the second rotary member of the second planetary gear set and the third rotary member of the third planetary gear set to each other, and the sixth clutch selectively connects the first rotary member of the second planetary gear set and the third rotary member of the fourth planetary gear set to each other.

* * * * *